ELECTROPLATING METHOD

Filed Sept. 17, 1952 2 Sheets-Sheet 1

INVENTOR.
Temple Nieter
BY Norman L. Mueller
Atty.

INVENTOR.
Temple Nieter
BY Foorman L. Mueller
Atty.

United States Patent Office 2,783,193

Patented Feb. 26, 1957

2,783,193

ELECTROPLATING METHOD

Temple Nieter, Evanston, Ill., assignor to Motorola, Inc., Chicago, Ill., a corporation of Illinois Application September 17, 1952, Serial No. 309,967

3 Claims. (Cl. 204—15)

Figure 1:
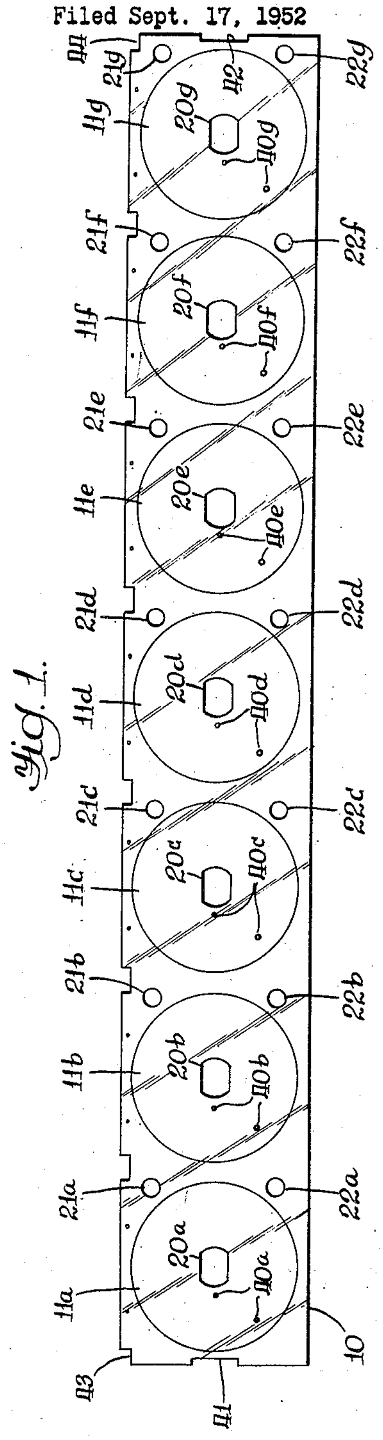

The present invention is concerned with an improved method for coating insulating bases with metal, and more particularly with a method whereby a single insulating base or a plurality of relatively small bases may have electrical conductors imprinted thereon in an improved and convenient fashion.

In the printed circuit art it is often desirable to imprint a particular electric circuit design on each of a plurality of similar insulating bases. This may be achieved, for example, by coating such bases with metallic silver, stencil-screening a resist mask over portions of the surface of the base upon which no conductor is to appear, electroplating a copper conductor on the exposed surface of the coated base, and removing the resist and unplated portions of the silver layer. Such a process is disclosed and claimed in copending application Serial No. 120,165, filed October 7, 1949 in the name of Temple Nieter and entitled "Electroplating Process," which has now issued as Patent 2,699,424; and in copending application Serial No. 297,285, filed July 5, 1952 as a continuation in part of the first mentioned application, which has now issued as Patent 2,699,425; both being assigned to the present assignee. It is evident that when this process is applied to a large number of small insulating bases in order to imprint a particular circuit design thereon, an undue amount of labor and handling is involved in applying each step of the process individually to each base. In order to render the operation more efficient, it has been proposed that such bases be supported in a suitable carrier and be successively coated with silver, stencil-screened and electroplated. The subject invention provides a method whereby such simultaneous treatment of a number of insulating bases may be conveniently effected.

A further requirement in the treatment of insulating bases in the manner outlined above, is that the edges thereof and of certain pilot or positioning holes do not become coated with silver and subsequently copper plated in order to prevent waste and, in some instances, to prevent a short circuit from one surface to the other in the event that separate electrical circuits are imprinted on both surfaces of the base. The method of this invention provides a convenient means whereby such undesired coating of the edges of the insulating base and of pilot holes therein is prevented.

It is also desirable, under certain circumstances, to imprint electrical circuits on a single insulating base having relatively large openings therein. This creates problems in that not only is it often desirable that the edges of such openings remain uncoated for the above reasons, but also in that difficulties are often encountered in applying a resist onto the surface of such a structure since the relatively large openings render the stencilling operation extremely awkward to accomplish. The method of this invention is extremely well suited to overcome such problems.

It is, accordingly, an object of the present invention to provide a new and improved method for imprinting electric circuits upon one or more base members.

A further object of the invention is to provide such an improved method for imprinting electric circuits on one or more base members, by means of which the entire process may be carried out with increased simplicity and in less time that former processes of this type.

A feature of the invention is the provision of a retainer for a plurality of insulating bases which holds such bases in a suitable position for simultaneous treatment and electroplating, and at the same time which prevents the metallic coating or plating from reaching the edges of the insulating bases or the sides of any apertures therein in which electrical conductivity is not required.

Another feature of the invention is the provision of a simple and convenient method for facilitating the application by silk screening or other means of the resist mask used in the process.

Figure 2:
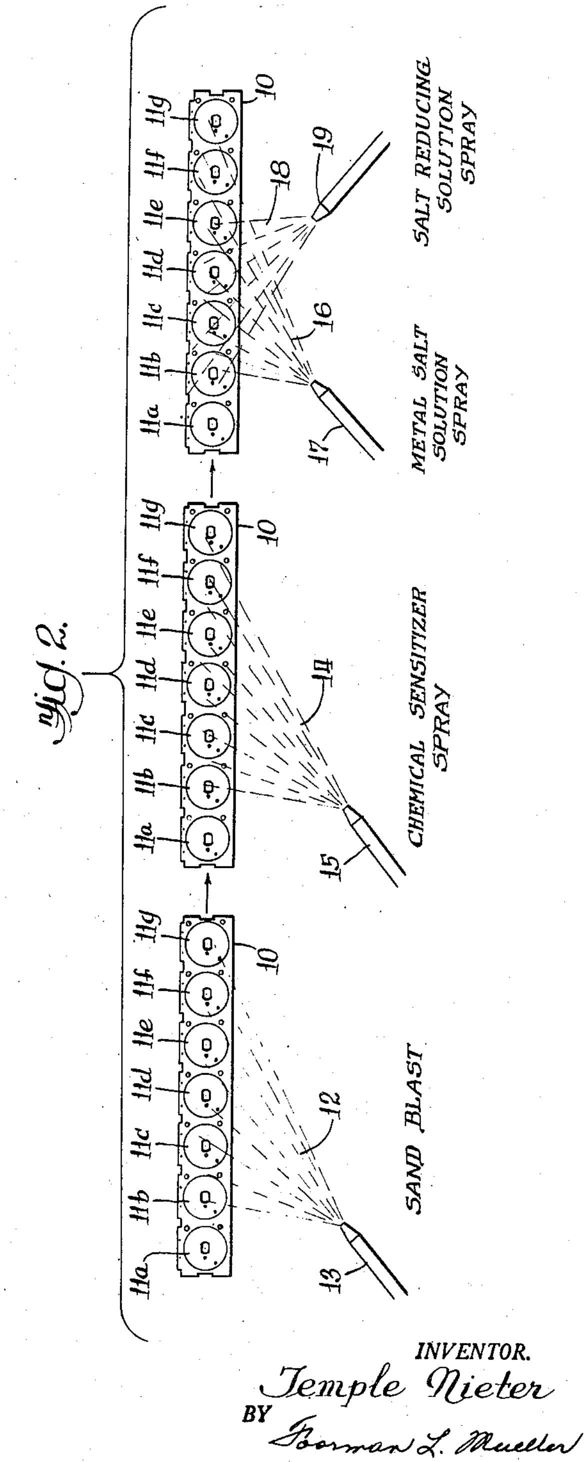
Figure 3:
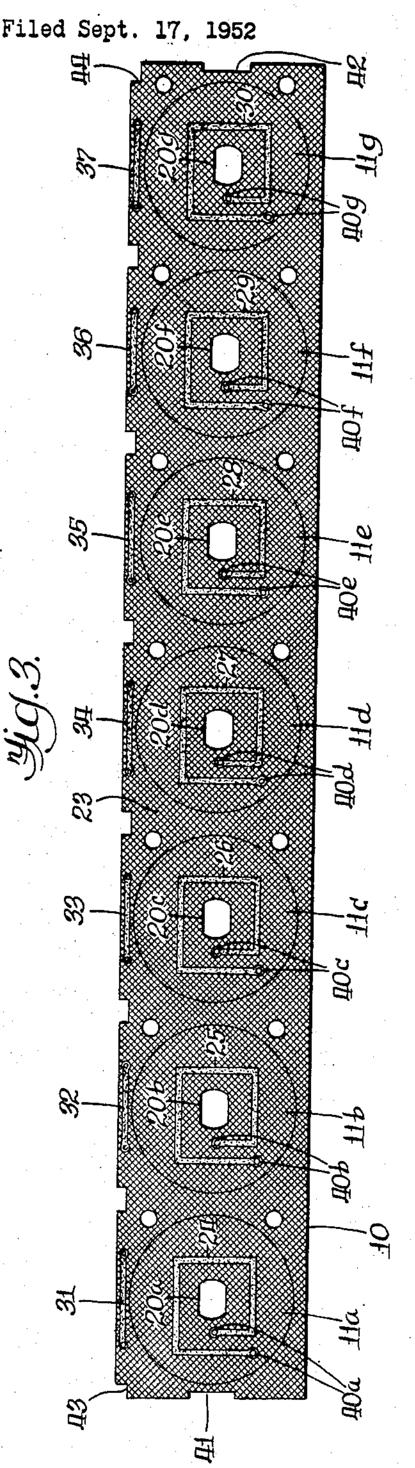
Figure 4:
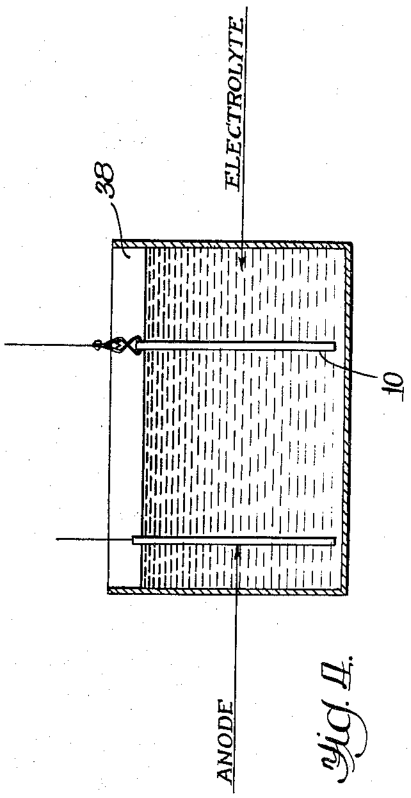

The above and other features of the invention which are believed to be new are set forth with particularity in the appended claims. The invention itself, however, together with further objects and advantages thereof may best be understood by reference to the following description when taken in conjunction with the accompanying drawings in which:

Fig. 1 shows a strip of insulating material with a plurality of insulating bases formed therein, Fig. 2 is a schematic representation of several stages of a process by which a silver layer is applied to the surfaces of the insulating bases and strip, Fig. 3 shows the insulating bases and strip after being coated with silver and having a stencil-screen applied thereover so that a resist may be coated thereon, and Fig. 4 shows suitable electroplating apparatus.

The invention is concerned with a method for simultaneously forming a metallic coating upon a plurality of insulating bases and comprises essentially the following steps. A plurality of insulating bases are first formed in a single strip of insulating material, for example, by a punching operation in which a die punches the bases partially out of the strip. The bases are then reinserted with no change in orientation within the apertures of the strip from which they were formed to be flush with the surfaces of the strip, for example, by a ram, allowing the bases to be frictionally retained within the apertures. Finally, a metallic coating is applied simultaneously over the plurality of bases while retained by the aforementioned insulating strip, and various other steps in the electroplating process may be effectuated while the bases are so retained.

It is normal procedure to form a plurality of insulating bases upon which electric circuits are to be imprinted from a single insulating strip 10, such as shown in Fig. 1. In accordance with prior procedures, however, once the insulating bases have been punched from the strip the latter is considered to have no further utility and is discarded. The insulating bases are then individually coated and electroplated or placed in a conveyor belt to undergo the necessary treatment. The present invention, on the other hand, provides that the insulating bases be retained in strip 10 so that the strip may form a convenient vehicle for the bases allowing them to be treated simultaneously.

For the above reason, bases 11a—11g are punched only partially out of the apertures in strip 10, and at the same time the bases are pierced by a plurality of holes 40a—40g which, as fully described in the aforementioned copending applications, may have their edges plated to form appropriate terminals or connections between electric circuits imprinted on both sides of the insulating bases. Bases 11a—11g are also pierced by center mounting holes

20a—20g during the punching operation, the mounting holes being used in subsequent operations on the bases. The latter holes preferably have edges which are not coated with metal since they later serve mechanical purposes in assembly, therefore their slugs are reinserted flush with bases 11a—11g. Retaining strip 10 also has a series of holes 21a—21g and 22a—22g formed therein for positioning the strip during the punching operation. Moreover, since preferably a plurality of strips 10 each retaining their insulating bases are successively treated during subsequent operations in the process, each strip has a pair of end grooves 41, 42 so that successive strips inclined slightly to the vertical in alternate directions may have their ends interlocked one with the other so that the strips may retain a desired orientation during such operations.

To permit accurate locating of strip 10 and, therefore, of bases 11a—11g during the stencilling and other operations in the process, edge notches 43 and 44 are formed in strip 10 concurrently with the punching operation whereby bases 11a—11g are partially punched out of the strip and during which holes 40a—40g are pierced in the bases. Bases 11a—11g are then reinserted within the apertures in strip 10, for example, by a suitable ram so that the surfaces of the bases are flush with the surfaces of the strip.

Fig. 2 shows the simultaneous treatment of the insulating bases so that they may be appropriately coated with a metallic silver layer. This coating process, as fully described in previously mentioned copending application Serial No. 297,285, comprises roughening and cleaning the insulating bases and strip 10 by a sandblast 12 from nozzle 13. As previously pointed out, a plurality of strips 10 with the retained insulating bases are preferably treated successively and maintained in proper alignment during the sandblast and other operations in their interlocked relation by end grooves 41, 42. The assembly is then airblown and rinsed to remove the sand particles, and a chemical sensitizer spray 14 is then applied from a nozzle 15. The assembly is then rinsed to reduce the sensitizer to a trace and thereafter sprayed simultaneously by a silver salt solution 16 from nozzle 17 and by a salt reducing spray 18 from nozzle 19. These sprays react with the chemical sensitizer to form metallic silver on the surface of insulating bases 11a—11g and on strip 10.

When it is desired that both sides of the bases and strip be coated, the sandblasting and spraying operations may be conducted simultaneously from both sides of the assembly. Due to the fact that the insulating bases are securely supported in strip 10, the silver coating appears only on their flat surfaces and not along the edges where such coating is undesired. Moreover, to prevent the edges of center holes 20a—20g from being coated they may also be plugged in the same manner as bases 11a—11g plug the apertures in strip 10.

After the assembly has received a coating of metallic silver by the process illustrated in Fig. 2, a silk screen stencil, such as shown in Fig. 3 is laid over the assembly. The stencil has a design masked thereon corresponding to the configuration of the electrical conductor that is to appear on each insulating base and upon strip 10 when it is desired that the strip also serve as a base for an electric circuit. For example, stencil screen 23 has a design 24 coinciding with insulating base 11a, and designs 25—30 corresponding respectively with insulating bases 11b—11g. In the illustrated embodiment, designs 24—30 are shown as being identical, however, there is no reason why these designs should not be different for each insulating base. Moreover, the stencil is blanked at portions 31—37 corresponding to an electrical conductor design that is to be imprinted on strip 10 itself. It is to be understood that a similar stencil screen may be placed on the opposite side of the assembly of Fig. 3 so that similar or different conductor designs may be imprinted on the reverse side of each of the insulating bases 11a—11g, and on the reverse side of insulating strip 10. Also, stencilling may be performed on the bases one by one, as the strip advances.

Edge notches 43 and 44 are used accurately to locate strip 10 and the retained insulating bases with respect to the designs blanked on the stencil. Since the edge notches are formed concurrently with the holes 40a—40g in the insulating bases and since the bases are reinserted in the apertures flush with the surfaces of strip 10 without any loss in orientation, precise registry is obtained between holes 40a—40g and the designs blanked on the stencil screen.

With the stencil screen placed in the position of Fig. 3, lacquer or other suitable resist is squeegeed onto the silvered surfaces of bases 11a—11g, and onto the silvered surface of strip 10. The resist covers these surfaces except for those portions masked by the previously described designs on the stencil. The designs 24—30 terminate in respective registry with holes 40a—40f in the insulating bases to constitute terminal connections for the designs.

The stencil is then removed and the assembly is placed in an electroplating bath 38, as shown in Fig. 4, so that a copper layer may be plated to a desired thickness on the unmasked surfaces of the insulating bases 11a—11g and on the uncovered portions of the retaining strip 10. As previously pointed out, when it is desired that terminals be formed or an electrical connection be made from the conductors on one side of the insulating bases to the conductors on the other side, the apertures (such as 40a—40g) are left unplugged during the silvering and copper plating process so that the edges thereof are copper plated as set forth in the previously referred to copending applications. However, holes such as center holes 20a—20g may be plugged during silvering and remain plugged during the copper plating so that no conductor is formed therein. It is also to be noted, that even though no electrical conductor is desired upon insulating bases 11a—11g, but only on strip 10, the present process is still extremely useful, for the squeegeeing operation is greatly facilitated upon a structure such as strip 10 having large apertures therein when such apertures are plugged. This obtains, as mentioned previously, since otherwise extreme difficulties are encountered due to the overflow of the resist into the apertures and distortion of the stencil screen.

Once the copper electroplating process is complete, the resist may be dissolved by any suitable means such as disclosed in the previously mentioned applications. For example, should lacquer be used as the resist material, it may be dissolved in a suitable caustic solution. It is also necessary to remove the silvered portions that are uncoated by the plated copper, and this may be done by brushing, etching with nitric acid, or by any of the processes disclosed in the aforementioned copending applications.

The insulating bases may now be removed from the retaining strip 10 and the finished product has a copper conductor firmly supported on each of a plurality of insulating bases by a thin silver layer. The conductor may appear on both sides of the bases and portions thereof may be interconnected through the base by apertures which were left unplugged during the plating process, as previously described. Likewise, the retaining strip may if so desired have an electric circuit imprinted thereon as previously noted, and plugging of the relatively large hole by bases 11a—11g facilitates the application of the resist.

The invention provides, therefore, a simple and expedient method whereby a plurality of insulating bases may be treated simultaneously to reduce manual handling and costs of fabrication to a minimum. Moreover, the use of the method of this invention results in an improved product in which an electric circuit design may be imprinted on both sides of an insulating base, but short circuits and wasteful coating due to edge plating are prevented in a simple and expeditious manner. A further advantage of the invention is that it enables the convenient processing of insulating strips having relatively large apertures therein. It is apparent that, although insulating bases 11*a*—11*g* are shown disc shaped, these bases may have any regular or irregular shape as may the apertures in retaining strip 10. Moreover, the process finds ready application when it is desired to imprint electrical conductors on regular or irregular shaped annular bases.

While particular embodiments of the invention have been shown and described, modifications may be made, and it is intended in the appended claims to cover all such modifications as fall within the true spirit and scope of the invention.

I claim:

1. A method for forming a metallic coating on at least one surface of an insulating base which includes in sequence the steps of providing a flat strip member of an insulating material, punching at least one plug member at least partially out of said strip member and thereby forming a hole in said strip member, reinserting said plug member in the hole in said strip member with the surfaces of said plug member flush with the surfaces of said strip member, spraying a metallic compound solution and a reducing solution over at least one entire surface of the strip and of the supported plug member to form a continuous metallic coating over said strip member and said plug member, said plug member fitting tightly in the hole in said strip member so that the metallic coating does not cover the edges of said plug member or of the hole through said strip member, and subsequently removing said plug member from said strip member.

2. A method for simultaneously forming a metallic coating upon at least one surface of each of a plurality of insulating base members which includes in sequence the steps of providing a flat strip of an insulating material from which the base members are to be formed, punching a plurality of base members at least partially out of said strip and thereby forming a plurality of holes in said strip, reinserting said base members in the holes in said strip with the surfaces of said base members flush with the surfaces of said strip, spraying a metallic compound solution and a reducing solution over at least one entire surface of the strip and of the supported base members to form a continuous metallic coating over at least one surface of each of said base members and of said strip, said base members fitting tightly in said strip so that said metallic coating is not formed on the edges of said base members or in the holes formed in said strip, and subsequently removing said base members from said strip.

3. A method for simultaneously forming electrical conductors upon at least one of each of a plurality of insulating base members which includes in sequence the steps of providing a flat strip of an insulating material from which the base members are to be formed, punching a plurality of base members at least partially out of said strip and thereby forming a plurality of holes in said strip, reinserting said base members in the holes in said strip with the surfaces of said base members flush with the surfaces of said strip, spraying a metallic compound solution and a reducing solution over at least one entire surface of the strip and of the supported base members to form a first continuous metallic coating over at least one surface of each of said base members and of said strip, said base members fitting tightly in said strip so that said metallic coating is not formed on the edges of said base members or in said holes in said strip, applying a resist material over areas of the coated surfaces of said base members and of said strip upon which no electrical conductors are to be formed to mask such surfaces from electroplating, electroplating a second metallic coating over portions of the first metallic coating other than those covered by said resist material, removing said resist material and those portions of said first continuous metallic coating underlying said resist material, and removing said base members from said strip.

References Cited in the file of this patent

UNITED STATES PATENTS

| | | |
|---|---|---|
| 1,149,974 | Chisholm | Aug. 10, 1915 |
| 1,647,474 | Seymour | Nov. 1, 1927 |
| 1,892,755 | Scheppmann | Jan. 3, 1933 |
| 2,000,756 | Heck | May 7, 1935 |
| 2,137,831 | Brunke | Nov. 22, 1938 |
| 2,172,604 | Blackburn | Sept. 12, 1939 |
| 2,174,071 | Grupe | Sept. 26, 1939 |
| 2,214,646 | Walker | Sept. 10, 1940 |
| 2,433,384 | McLarn | Dec. 30, 1947 |
| 2,441,960 | Eisler | May 25, 1948 |
| 2,443,119 | Rubin | June 8, 1948 |
| 2,444,255 | Hewlett | June 29, 1948 |

FOREIGN PATENTS

| | | |
|---|---|---|
| 2,675 | Great Britain | of 1862 |